(12) United States Patent
Hellebrekers et al.

(10) Patent No.: US 12,540,810 B2
(45) Date of Patent: Feb. 3, 2026

(54) SYSTEMS AND METHODS FOR SENSING DEFORMATION OF A MAGNETIC MATERIAL AND FABRICATION METHODS THEREOF

(71) Applicant: CARNEGIE MELLON UNIVERSITY, Pittsburgh, PA (US)

(72) Inventors: Tess Hellebrekers, Pittsburgh, PA (US); Carmel Majidi, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 0 days.

(21) Appl. No.: 17/621,646

(22) PCT Filed: Jun. 22, 2020

(86) PCT No.: PCT/US2020/039027
§ 371 (c)(1),
(2) Date: Dec. 21, 2021

(87) PCT Pub. No.: WO2021/061240
PCT Pub. Date: Apr. 1, 2021

(65) Prior Publication Data
US 2022/0349695 A1 Nov. 3, 2022

Related U.S. Application Data

(60) Provisional application No. 62/864,766, filed on Jun. 21, 2019.

(51) Int. Cl.
*G01B 7/24* (2006.01)
*G01D 5/14* (2006.01)

(52) U.S. Cl.
CPC .................. *G01B 7/24* (2013.01); *G01D 5/14* (2013.01)

(58) Field of Classification Search
CPC .................. G01B 7/24; G01D 5/14
See application file for complete search history.

(56) References Cited

U.S. PATENT DOCUMENTS

| | | | | |
|---|---|---|---|---|
| 4,475,078 A | * | 10/1984 | Itani | G01R 31/1254 324/529 |
| 5,694,375 A | * | 12/1997 | Woodall | H04R 1/44 367/185 |

(Continued)

FOREIGN PATENT DOCUMENTS

| | | | | |
|---|---|---|---|---|
| EP | 1521071 A2 | * | 4/2005 | ......... B60C 23/0408 |
| EP | 2325490 A1 | | 5/2011 | |

(Continued)

OTHER PUBLICATIONS

International Search Report and Written Opinion of the International Searching Authority for PCT Application PCT/US2020/039027 dated May 7, 2021.
Choi, B. J. et al. "Magnetic patterns based global localization for a mobile robot using hall sensors." In 2009 International Conference on Mechatronics and Automation, pp. 192-197. IEEE, 2009.
Clark, J. J. "A magnetic field based compliance matching sensor for high resolution, high compliance tactile sensing." In Proceedings. 1988 IEEE International Conference on Robotics and Automation, pp. 772-777. IEEE, 1988.

(Continued)

*Primary Examiner* — Walter L Lindsay, Jr.
*Assistant Examiner* — Milton Gonzalez
(74) *Attorney, Agent, or Firm* — Michael G. Monyok

(57) ABSTRACT

A soft magnetic sensor comprising a soft material containing randomly distributed magnetic microparticles and a magnetometer that can estimate force and localize contact over a continuous area. A reference magnetometer can be used to filter motion and ambient noise. Methods for locating contact and determining force comprise data analysis of the magnetometer output. In some embodiments, the sensor can localize an object prior to contact.

16 Claims, 19 Drawing Sheets

(56) References Cited

U.S. PATENT DOCUMENTS

| | | | |
|---|---|---|---|
| 7,663,362 B2* | 2/2010 | Kishida | G01R 33/04 |
| | | | 73/862.391 |
| 7,992,444 B2* | 8/2011 | Takeuchi | G01R 33/072 |
| | | | 73/728 |
| 9,335,149 B2* | 5/2016 | Stark | G01B 7/004 |
| 9,804,040 B2* | 10/2017 | Shigeto | B29C 35/02 |
| 10,094,884 B2* | 10/2018 | Fukuda | G01R 31/392 |
| 10,575,738 B2* | 3/2020 | Tanaka | A61B 5/7203 |
| 2010/0090691 A1 | 4/2010 | Kishida | |
| 2010/0199524 A1* | 8/2010 | Grun | A43B 17/14 |
| | | | 36/43 |
| 2015/0105630 A1* | 4/2015 | Kummerl | A61B 5/0205 |
| | | | 600/502 |
| 2015/0253207 A1 | 9/2015 | Shigeto et al. | |
| 2015/0338291 A1 | 11/2015 | Shigeto et al. | |
| 2016/0153846 A1 | 6/2016 | Inoue et al. | |
| 2017/0122719 A1 | 5/2017 | Fukuda et al. | |
| 2017/0336272 A1 | 11/2017 | Alfadhel et al. | |
| 2018/0317318 A1 | 11/2018 | Yamada et al. | |

FOREIGN PATENT DOCUMENTS

| | | |
|---|---|---|
| JP | 2010-532690 A | 10/2010 |
| JP | 2018-007821 A | 1/2018 |
| JP | 2018017536 A | 2/2018 |
| JP | 2018060944 A | 4/2018 |
| WO | 2018163833 A1 | 9/2018 |

OTHER PUBLICATIONS

Ledermann, C. et al. "Tactile Sensor on a Magnetic Basis using novel 3D Hall sensor-First prototypes and results." In 2013 IEEE 17th International Conference on Intelligent Engineering Systems (INES), pp. 55-60. IEEE, 2013.

Paulino, T. et al. "Low-cost 3-axis soft tactile sensors for the human-friendly robot Vizzy." In 2017 IEEE international conference on robotics and automation (ICRA), pp. 966-971. IEEE, 2017.

Bin Rosle, M. et al. "Soft fingertip with tactile sensation for detecting grasping orientation of thin object." In 2018 IEEE International Conference on Robotics and Biomimetics (ROBIO), pp. 1304-1309. IEEE, 2018.

Bourny, V. et al. "A localization system based on buried magnets and dead reckoning for mobile robots." In 2010 IEEE International Symposium on Industrial Electronics, pp. 373-378. IEEE, 2010.

You, W. S. et al. "Global localization for a small mobile robot using magnetic patterns." In 2010 IEEE International Conference on Robotics and Automation, pp. 2618-2623. IEEE, 2010.

Jamone, L. et al. "Highly sensitive soft tactile sensors for an anthropomorphic robotic hand." IEEE sensors Journal 15, No. 8 (2015): 4226-4233.

Tomo, T. P. et al. "Design and characterization of a three-axis hall effect-based soft skin sensor." Sensors 16, No. 4 (2016): 491.

Wu, Y. et al. "A skin-inspired tactile sensor for smart prosthetics." Science Robotics 3, No. 22 (2018): eaat0429.

* cited by examiner

SYSTEMS AND METHODS FOR SENSING DEFORMATION OF A MAGNETIC MATERIAL AND FABRICATION METHODS THEREOF

CROSS-REFERENCE TO RELATED APPLICATIONS

This application claims the benefit under 35 U.S.C. § 119 of Provisional Application Serial No. 62/864,766, filed Jun. 21, 2019, which is incorporated herein by reference.

STATEMENT REGARDING FEDERALLY SPONSORED RESEARCH

This invention was made with government support under N00014-16-1-2301 awarded by the Office of Naval Research. The government has certain rights in the invention.

BACKGROUND OF THE INVENTION

The technology of the disclosure relates generally to sensing. More particularly, the invention relates to soft sensing that uses the deformation of a magnetic material to provide feedback about its environment.

Continued development in wearable technologies, soft robotics, and human-robot interaction has increased interest in sensors. With these technologies, inaccuracies in determining an object's position can affect the ability to execute certain functions. For example, with robotic systems, inaccuracies can prevent the robot from locating and manipulating tools or other objects. Vision-based sensing excels at finding objects in the workplace, but cannot provide guidance closer than 1-2 cm from the target object. In addition, vision-based systems do not perform well if the camera is occluded or the surface is reflective or transparent.

To overcome the limitations of vision-based systems, tactile sensors provide critical information about their environment by measuring contact forces. Because tactile sensors are based on touch, they only provide information after an object is contacted and do not aid in the approach to the target object. Soft tactile sensors are a subclass of tactile sensors that employ deformable and compliant materials at the interaction surface. Soft sensors not only provide rich environmental information, but also contribute effective mechanical properties that enable successful robotic manipulation, human-robot interaction, and material classification. Soft tactile sensors can use a variety of transduction modes, such as optical, resistive, and capacitive. While soft tactile sensors can provide greater precision than vision-based sensors, widespread implementation of soft sensors remains limited due to non-scalable fabrication techniques, lack of customization, and complex integration requirements. For example, with resistive or capacitive soft sensors, the increased density of each unit is linked to an unmanageable scaling in wiring and failure at weak soft-rigid electrical interfaces. In addition, like other tactile sensors, soft tactile sensors only provide information once an object is contacted.

Magnetic sensing overcomes several of these obstacles as it has a limited dependency on direct electrical wiring, yet provides high resolution, high speed sensing by measuring changes in either the magnetic flux or electromagnetic induction. In addition, in some applications, magnetic sensing can provide sensor output prior to contact. Despite these improvements over other types of sensors, magnetic sensors are susceptible to environmental magnetic noise. Further, when implemented as a soft sensor, material failures can occur at the junction between the rigid magnets and the soft elastomers used for the sensor, thereby limiting the technology to non-soft sensing applications. For example, common magnetic sensors combine a Hall-effect sensing chip with a discrete permanent magnet suspended between two elastomer layers. Therefore, it would be advantageous to develop a sensing system that overcomes these limitations to provide a tactile surface for single-point contact localization and to provide rapid localization and force estimation in free space.

BRIEF SUMMARY

Aspects disclosed in the detailed description include a soft sensor, methods for sensing deformation of a magnetic material, and fabrication methods thereof Related methods and systems are also disclosed.

In at least one non-limiting embodiment is a soft magnetic sensor comprising a soft material containing randomly distributed magnetic microparticles and a magnetometer that can estimate force and localize contact over a continuous area. In one example, the sensor covers a continuous area of approximately 15-40 $mm^2$. In some embodiments discussed herein, force and localized contact are estimated using an integrated circuit for data analysis of the output from the magnetometer. In some embodiments, the magnetic material, or 'skin,' is comprised of a silicone elastomer loaded with magnetic microparticles. Upon deformation of the elastomer, a portion of the embedded magnetic particles can change position and/or orientation with respect to the magnetometer, resulting in a change in the net measured magnetic field. In one embodiment, the magnetometer may be embedded in the magnetic material to form an integrated sensor. In an alternative embodiment, the magnetic material and magnetometer are separate. Magnetic field data received by the magnetometer is analyzed to provide useful information for force and contact localization. Classification algorithms analyzing the output from the magnetometer can localize pressure with an accuracy of >98%. In some embodiments, regression algorithms can localize pressure to an approximately 3 $mm^2$ area on average. In this regard, systems and methods for sensing deformation of a magnetic material, such as a sensing skin, can address an increasing need for a simple-to-fabricate, quick-to-integrate, and information-rich sensor for use in fields such as robotic manipulation, soft systems, and wearables.

DETAILED DESCRIPTION

Figure 1A:
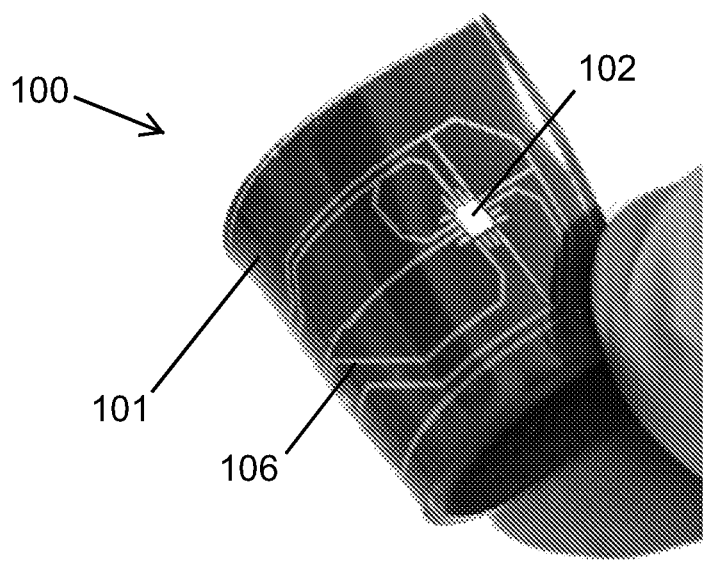
FIGS. 1A-1E show various embodiments of the sensor.
Figure 1B:
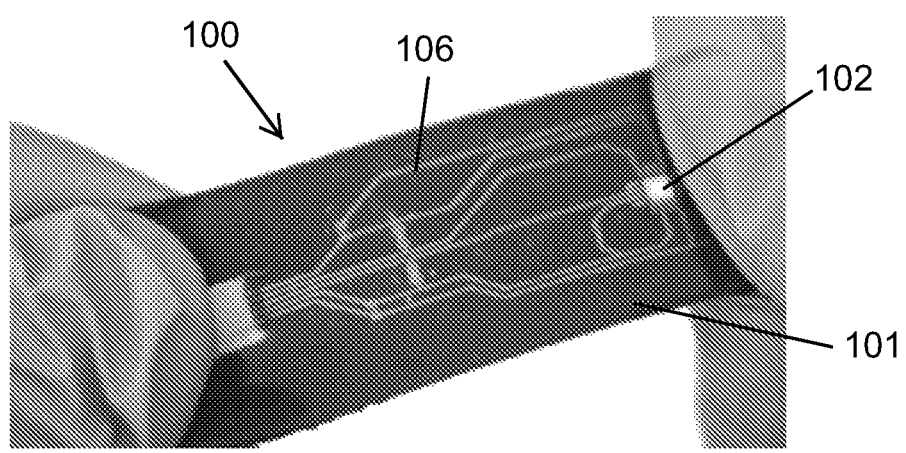

In one example embodiment, a sensor 100 comprises a magnetic material 101 and a magnetometer 102 capable of sensing changes in the magnetic field of the magnetic material 101 produced by a deformation of the material 101. In the example embodiment shown in FIGS. 1A-1B, the sensor 100 is implemented as a tactile skin having a fixed, stretchable 3-axis magnetometer 102 covered with a soft elastomer 103 that is embedded with a dispersion of magnetic microparticles 104, thereby forming the magnetic material 101. The composite magnetic material 101 retains the stretchability and flexibility of the host elastomer 103 and is compatible with stretchable circuitry. In alternative embodiments, multiple magnetometers 102 can be used (see FIGS. 1C-1D). As deformation is applied to the surface of the sensor 100, the magnetic microparticles 104 are displaced with respect to the relatively static position of the magnetometer 102. (see FIG. 1E) The magnetometer 102 measures the changes in the surrounding magnetic field and analyzes the data to determine the location and force of the contact. The magnetometer 102 measures its surrounding magnetic field in the x-, y-, and z-directions. The plurality of magnetic microparticles 104 distributed throughout the magnetic material 101 represent input data that is ultimately reduced to a 3-axis magnetic field measurement to preserve information about the deformation of the material 101. Morphological computation can also be leveraged through the inherent dimension reduction of the material 101 itself. For example, the sensor 100 can leverage morphological computation properties to inherently reduce the dimensionality of the output before analysis, thereby eliminating the need for a dense array of underlying microelectronic chips and wiring.

In contrast to a discrete permanent magnet or other convention magnets, the overall magnetic strength of the magnetic material 101 is smaller. However, the signal magnitude remains sufficient to localize contact and estimate force over the surface of the sensor 100. Further, incorporating microparticles 104 into the elastomer 103 allows a sensor 100 with very few limitations on shape, size, or thickness. Fabrication is also simplified as it does not require a multi-layer molding process, unlike some magnetic sensors.

Referring again to FIGS. 1C-1D, a sensor 100 with multiple magnetometers 102 is shown, with one magnetometer 102 identified as a reference magnetometer 105. In the embodiment shown in FIGS. 1C-1D, five magnetometers 102 are positioned adjacent to the magnetic material 101, with the reference magnetometer 105 positioned at a distance from the magnetic material 101. In this particular example, the five magnetometers 102 are positioned 15 mm apart, which is the range before the signal of the magnetic material 101 can no longer be detected by the closest magnetometer 102. Each 15 mm range overlaps with another magnetometer's range by 2.5mm in order to maximize function surface area and minimize the required number of magnetometers 102. The reference magnetometer 105 is used as a reference for measuring magnetic signals distinct from the magnetic material 101 (i.e. ambient magnetic noise). With multiple magnetometers 102 and a separate reference magnetometer 105, the sensor 100 is able to filter ambient magnetic noise and motion and can incorporate data analysis of the output to handle the increased non-linearity of the system. Stated differently, the signal from the reference magnetometer 105 combined with the main magnetometers 102 isolates changes in magnetic flux due to deformation of the magnetic material 101. The magnetic flux signal is evaluated to provide real-time estimates of force and location.

Figure 1C:
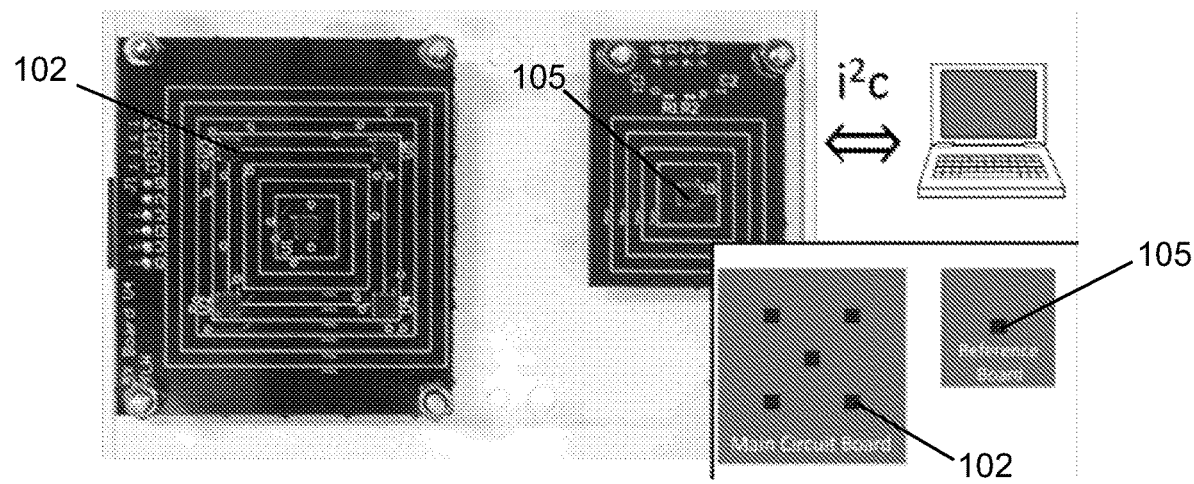
Figure 1D:
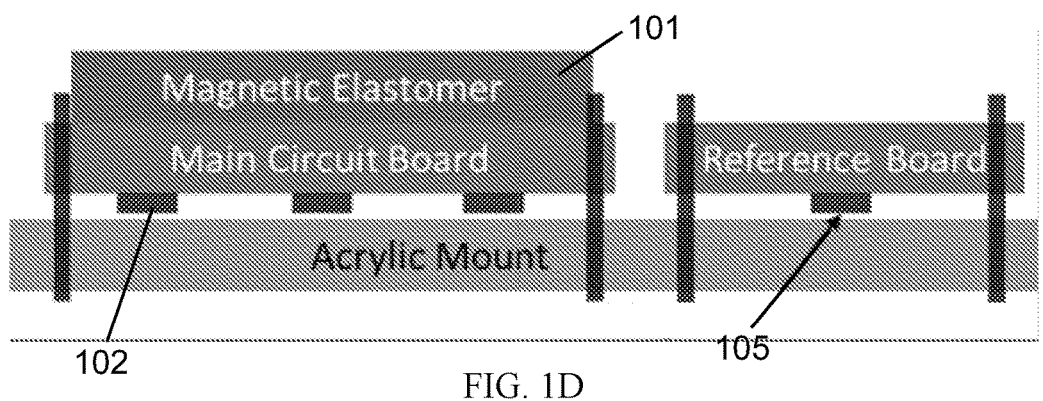
Figure 1E:
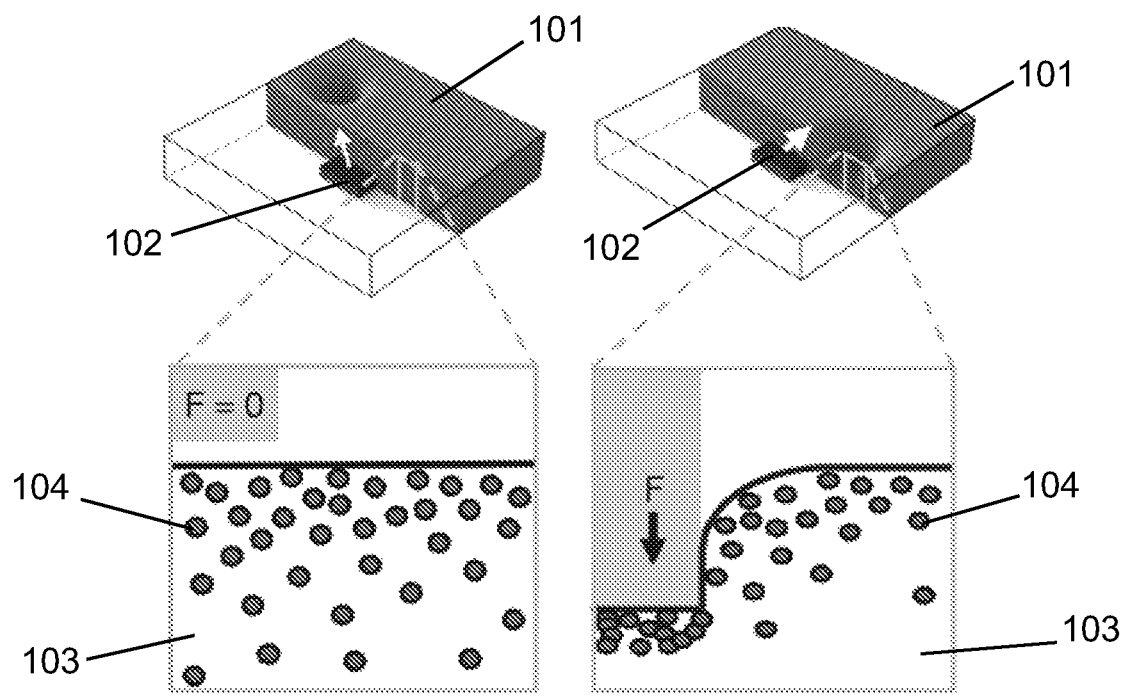
Figure 1F:
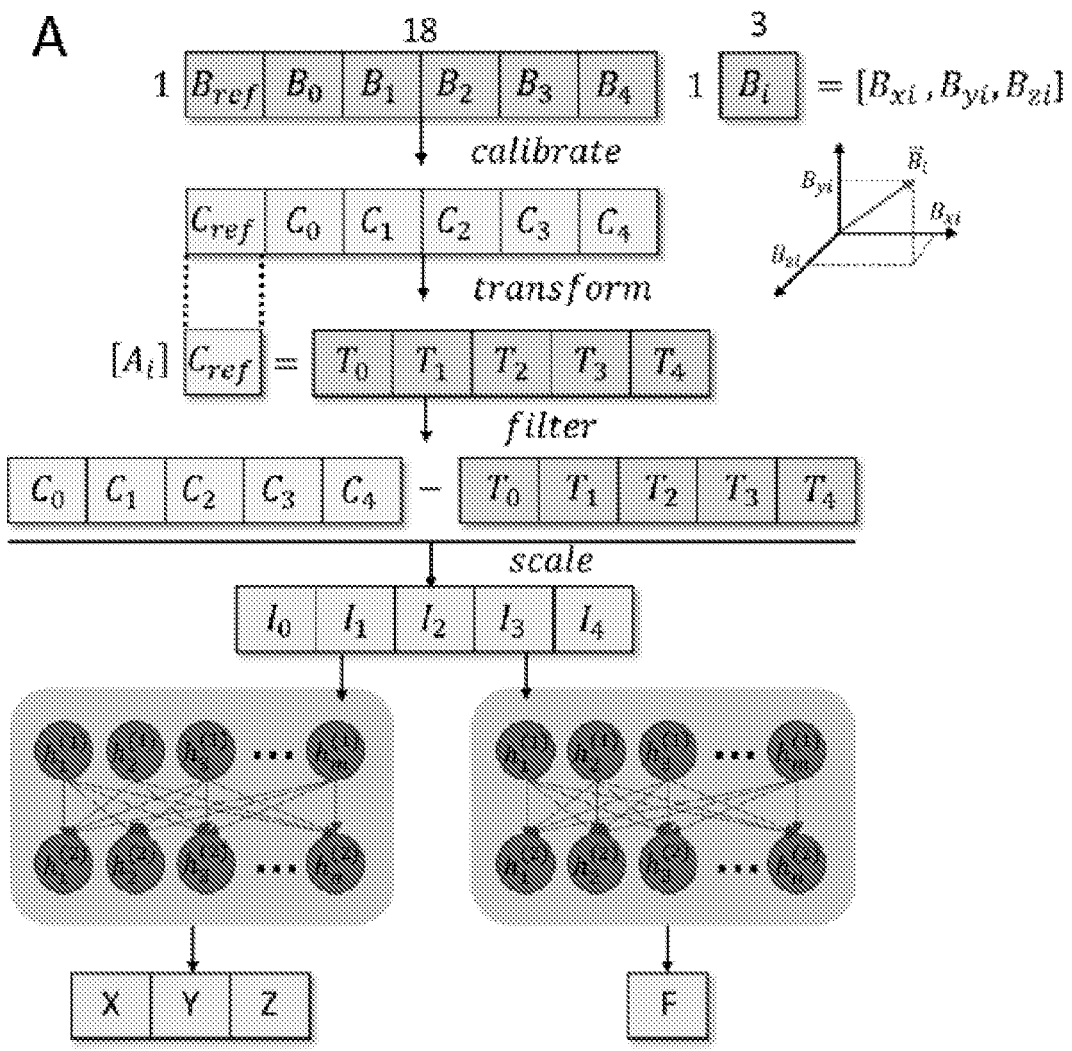
FIG. 1F is an outline of data processing steps.

In the example embodiment depicted in FIGS. 1C-1D, the signals can be evaluated by a trained neural network to provide estimates of the force and location of the contact on the sensor 100. FIG. IF is an outline of the preprocessing steps for contact localization and force estimation. In these preprocessing steps, the raw magnetometer values are calibrated individually, transformed from the reference signal, filtered, and scaled for neural network input.

By way of further detail, in one embodiment, the signal processing combines calibration and preprocessing to minimize the amount of data collection necessary while keeping the neural network input limited to raw magnetometer data. Each magnetometer 102 outputs three axis data about its surrounding magnetic field. For the embodiment shown in FIG. 1-2, six magnetometers 102, 105 are present for a total of 18 datapoints for each sample. For pre-calibrated magnetometers 102, 105 (which provides an offset and scaling), these parameters can be applied to the raw data to calibrate the signals individually. Offsets can be determined by the average between the maximum and minimum signals in each direction. Scales can be determined by dividing the average chord distance in all three by the average chord length in each direction. Next, the affine transform of the reference magnetometer 105 is applied onto the five magnetometers 102. If the reference magnetometer 105 remains fixed relative to the other magnetometers 102, this transform allows motion and ambient noise removal due to location and environmental noise. Noise removal allows the data collection to occur in one plane. With the data calibrated and filtered, the data is prepared for neural net input by removing the mean and scaling to unit variance determined from training data. While this system provides useful information, it can be susceptible to additional noise present in the multi-magnetometer 102, 105 system. As such, a multi-layer perceptron implemented in sklearn with MLPRegressor can be used.

In contrast to conventional technologies that use large rigid magnets, the magnetic microparticles 104, which may include magnetic Ne-Fe-B microparticles or nanoparticles, are on the order of approximately 200 µm in diameter or smaller. Although, different sizes and shapes of particles 104 may be used as long as the composite magnetic material 101 maintains a level of stretchability or softness, depending on the intended application. Depending on the intended application and the amount of magnetic particles 104 used, the composite magnetic material 101 can have the same or similar properties to the elastomer 103 used to create the composite material 101. In addition, the use of microscale magnetic particles 104 can reduce the intensity of internal stress concentrations when a mechanical load is applied to the magnetic material 101 and also allows for the material 101 to be flexible and/or stretchable. For example, when large magnets are embedded in an elastomer, delamination at the interface between the hard magnet and soft elastomer can occur under mechanical load due to the difference in compliance between the two materials. Moreover, such embodiments can allow for geometries that are thin and/or contain sharp 3D geometries.

Figure 8:
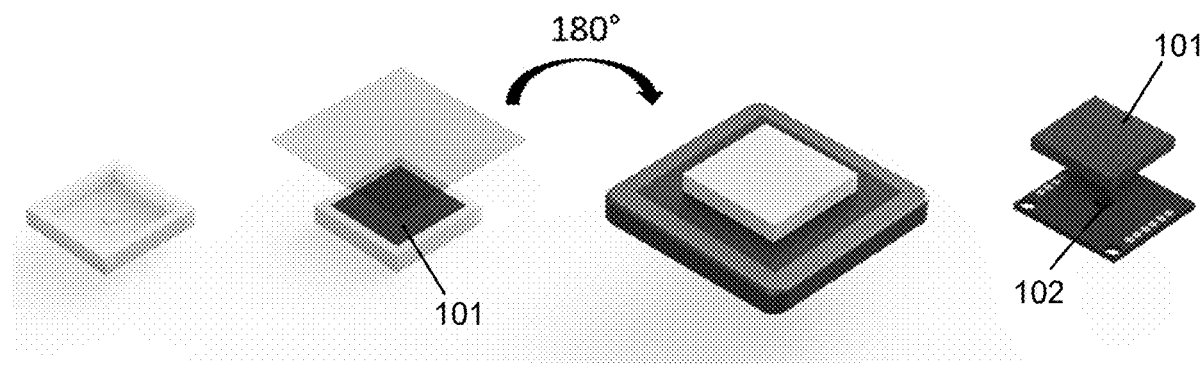
FIG. 8 is a flow diagram depicting a fabrication technique.

In one embodiment, the sensor 100 is formed in the following fabrication process (see FIG. 8). First, the magnetic material 101 is functionalized by mixing a silicone elastomer 103 with magnetic microparticles 104 and curing the composite material under a magnetic field. The material is cured in a magnetic field to align the magnetic microparticles 104 before they set in the cured elastomer 103, creating a homogeneous magnetic orientation of the magnetic particles 104. In alternative embodiments, a heterogeneous magnetic orientation is used. By way of further example, a pre-polymer and cross-linker can be shear mixed for approximately 30 seconds in a 1:1 ratio. The precured elastomer mixture can be hand-mixed with magnetic particles 104 (MQP-15-12; Magnequench) in a 1:1 weight ratio to form the magnetic material 101. The uncured magnetic material 101 can then be poured into a mold and degassed for 5 minutes. A thin plastic film may be placed on top of the mold and excess material 101 may be squeezed out. The mold can then be filled and then placed upside down on the surface of a permanent magnet (N48; Applied Magnets). The material 101 can then be cured at room temperature and removed from the mold in an hour. Finally, the magnetic material 101 may be adhered (Silpoxy; Smooth-On) to the top of a commercial magnetometer 102 board (such as a MLX90393; Sparkfun). In an alternative embodiment, a urethane foam is used as the elastomer 103; however, a person having skill in the art will appreciate that several types of elastomers 103 can be used. In yet further alternative embodiments, deformable materials other than a polymer can be used as the substrate for the composite magnetic material 101.

With regard to stretchable circuit 106 design and fabrication, the stretchable circuit 106 can include a magnetometer 102 (MLX90393; Melexis) and five output wires (FIG. 1B). The additional output wire can be for a second 3.3 volt line, which may be useful due to the single-layer design of the stretchable circuit 106. A thin layer of copper and chromium is sputtered into the surface of PDMS (Sylgard 184; Dow Corning) and patterned with a laser to leave behind circuit traces. Eutectic gallium indium (EGaIn) is selectively wetted to the remaining copper traces when immersed in a bath of NaOH. Then, the circuit component 106 can be placed directly on top of the liquid metal trace and sealed with an additional layer of PDMS.

By way of example, sensors 100 constructed in this manner are able to collect data, such as pressure data, that results from a deformation of the magnetic material 101 and a change in the magnetic field emanating from the material 101, which is sensed by the magnetometer 102. Due to a non-uniform distribution of particles 104 within the magnetic material 101 in some embodiments, which can create a unique magnetic field, data-driven techniques can be used to classify the location of a deformation occurring on the magnetic material 101 and estimate the depth of such a deformation. In particular, location can be classified with 98% accuracy for both a 3 mm resolution 5×5 grid, and a 5 mm radial circle with 3 discrete depths, for example. Regression algorithms can localize the contact to a 3 mm² area. In this regard, some embodiments disclosed herein provide an approach to address a need for a continuous and soft tactile surface with simple fabrication, quick integration, and adaptable geometry.

As a demonstration of location sensing, for an embodiment comprising a 5×5 grid, force and magnetic field changes were collected over a 3 mm resolution 5×5 grid up to a 3 mm depth (see FIG. 2A) for a total of 25 classes. 2750 contact samples were collected at these 25 locations using a uniform random distribution. Each class (25 total) includes approximately 100 samples each.

Figure 2A:
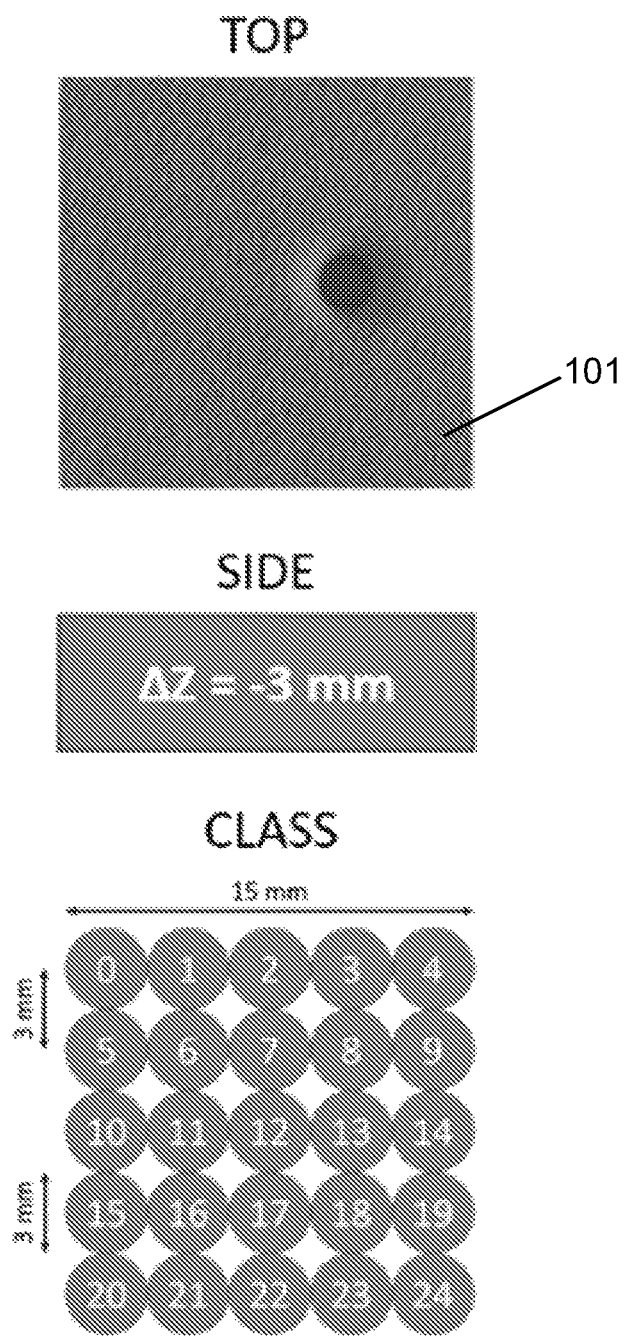
FIGS. 2A-2F are a series of graphs depicting the results of a sensing demonstration.
Figure 2B:
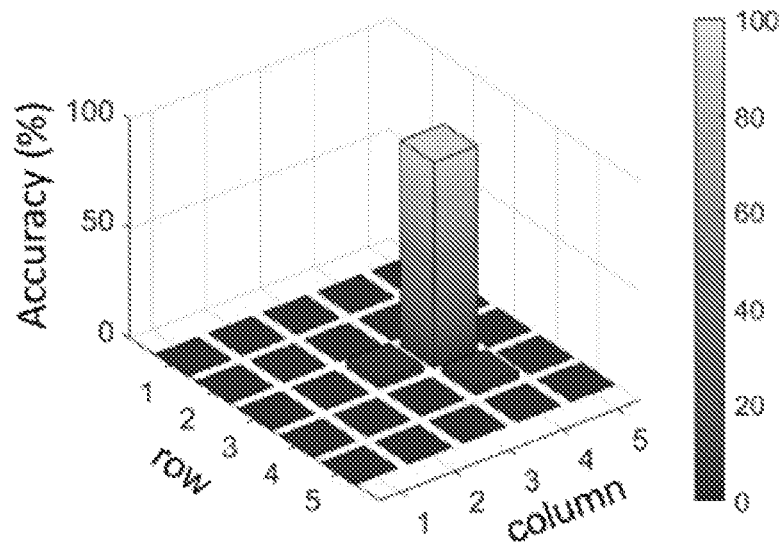
Figure 2C:
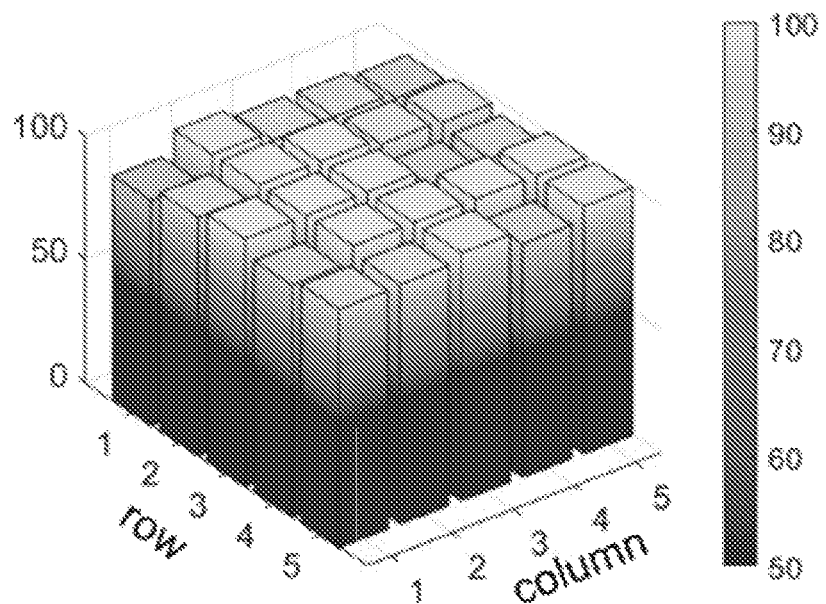
Figure 2D:
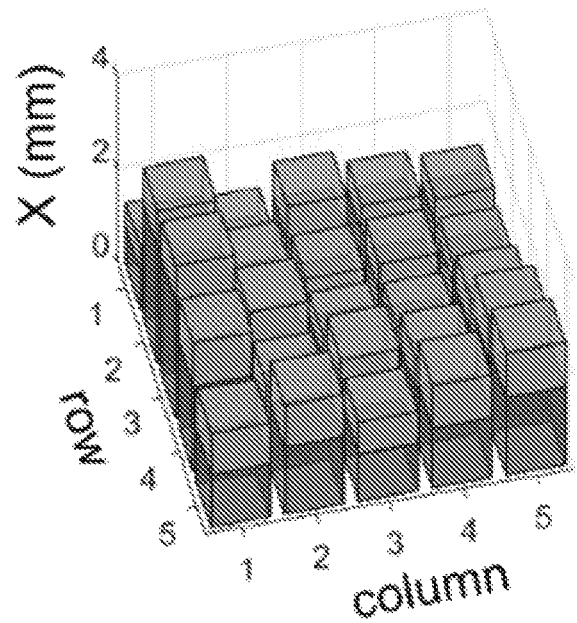
Figure 2E:
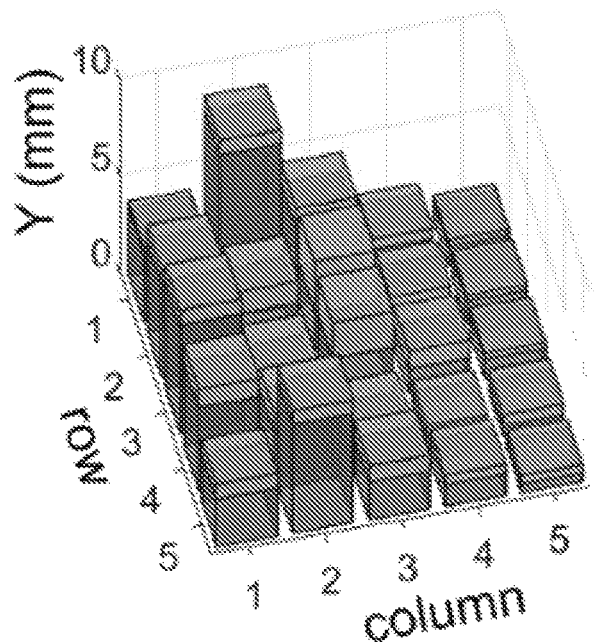

Several different classification algorithms were able to accurately distinguish between the 25 locations, as shown below. In this regard, classification results using quadratic discriminant analysis (QDA) are discussed herein to illustrate varying aspects of performance. In the event of a misclassification, the predicted class is adjacent to the true location (see FIG. 2B—QDA classification for location 13). Classification accuracy for every location are shown in FIG. 2C (all QDA classification results grouped by class). FIGS. 2D-2E show, respectively, the mean absolute error from linear regression grouped by location for x-position, for the y-position, and mean absolute error from KNN regression for force.

In order to estimate location, 25 discrete locations were transformed into their coordinate locations. For the 5×5 grid and linear regression experiment, the x-position has an average error of 1.1 mm and the y-position has an average error 3.8 mm. Output estimations near the edge of the sensor 100 may have a lower accuracy and higher standard deviation. Due to the magnetic signal to distance relationship of $1/d^3$, the quality of signal can be expected to decrease with distance. At these points along the edge, the random distribution of particles may begin to have a larger effect on output signal than the applied deformation. This can lead to unusual signal changes, and can be a reason why data-driven techniques may be more useful in some non-limiting embodiments instead of function fitting approaches.

Figure 3A:
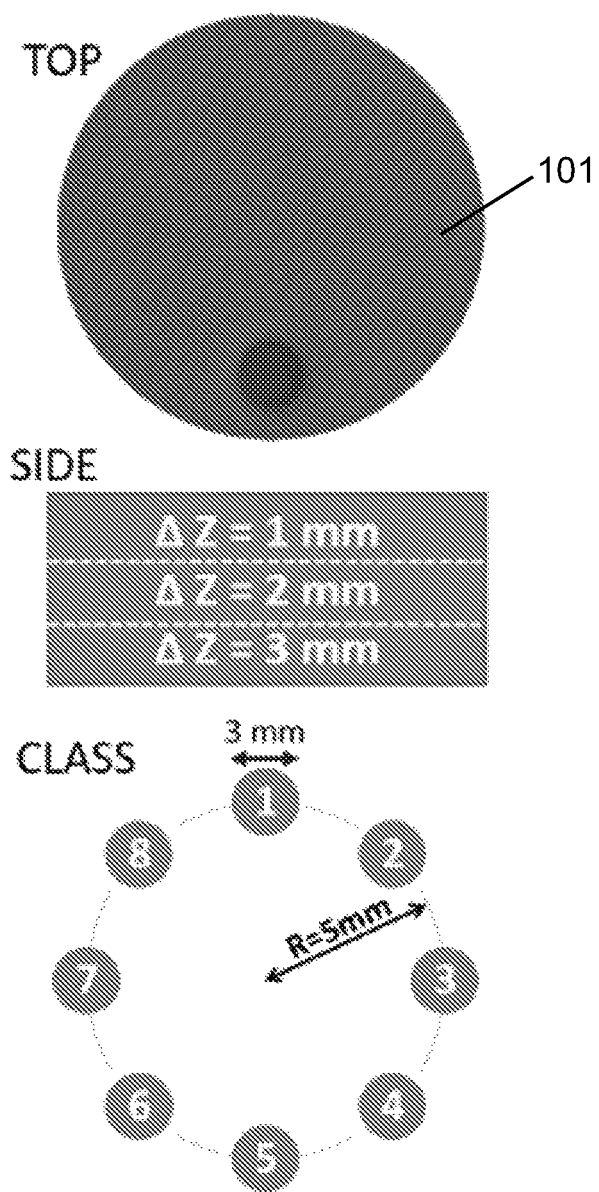
FIG. 3A-3G are a series of graphs depicting the results of an alternate sensing demonstration.
Figure 3B:
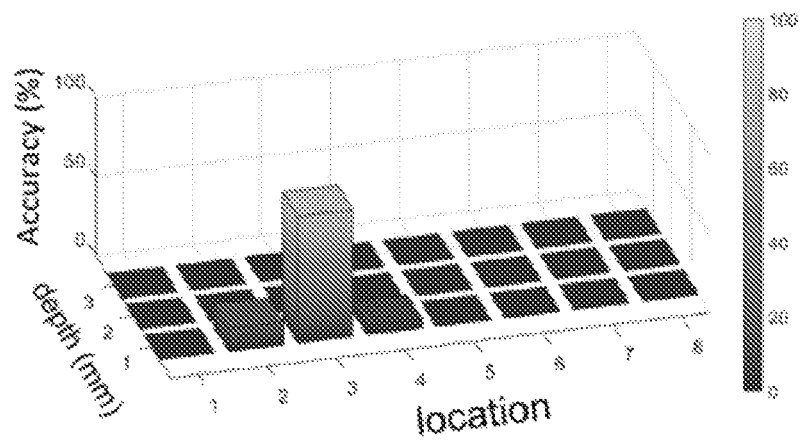
Figure 3C:
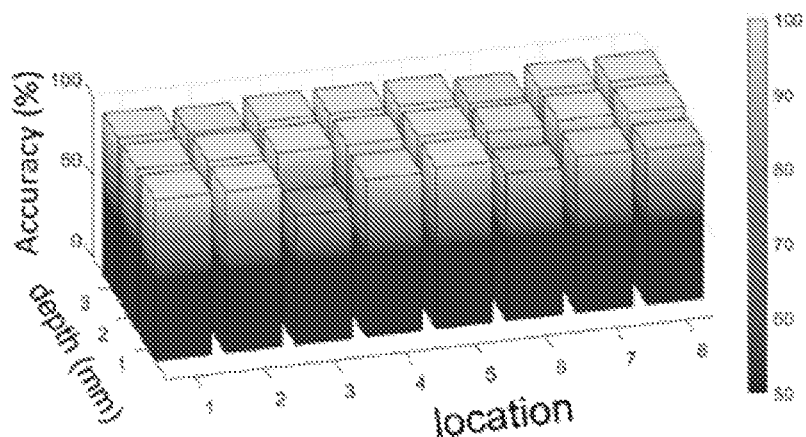
Figure 3D:
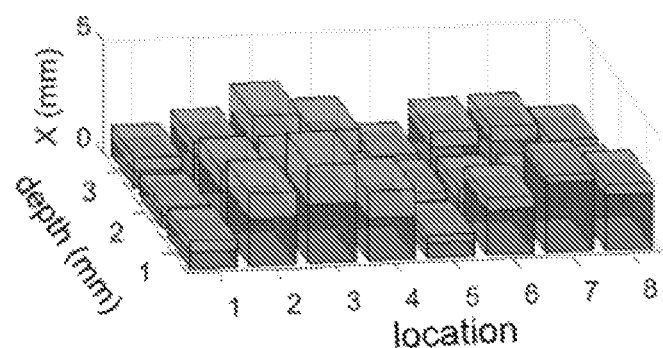
Figure 3E:
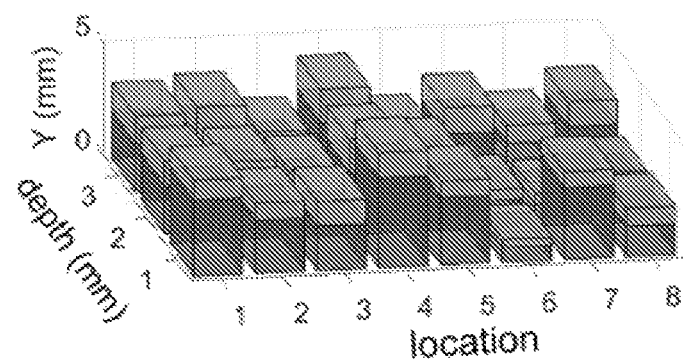
Figure 3F:
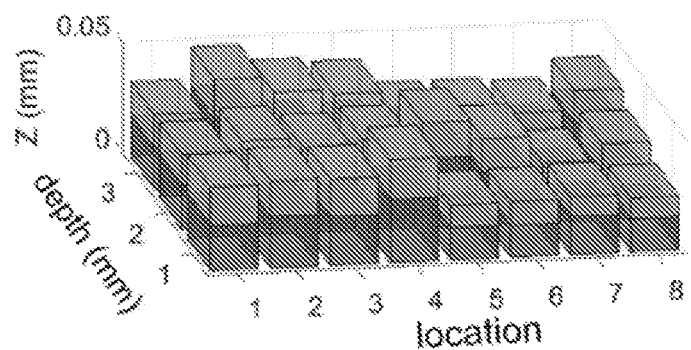
Figure 3G:
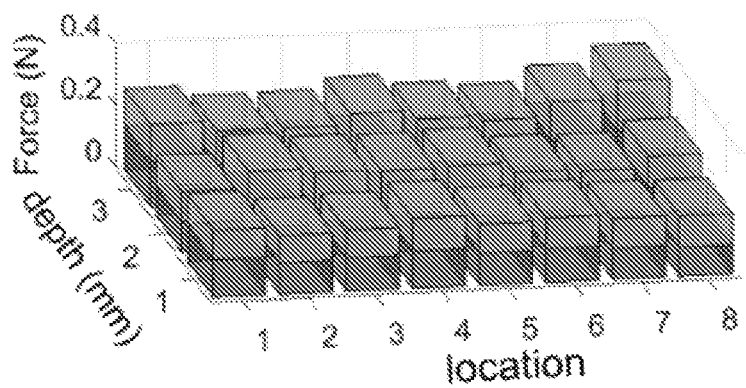

As a demonstration of location and depth sensing, for an embodiment comprising an circular sensor 100, force-controlled changes in magnetic field were measured for 8 different XY locations and 3 different depths (dZ=1, 2, or 3 mm) (see FIG. 3A). 2850 contact samples were collected for these 24 XYZ locations using a uniform random distribution. Each class (24 total) had approximately 110 samples each. As shown herein, Quadratic Discriminant Analysis (QDA) can be used to classify location based on both XY location and depth. If the predicted class is wrong, it can be predicted as an adjacent class (see FIG. 3B—QDA classification results for location 3 and a depth of 1 mm). Misclassification between adjacent locations may be more common than adjacent depths. The large correlation between z-axis magnetic field and pressure can be used to distinguish between the depths. Since all the tested locations are closer to the magnetometer 102 than the 5×5 experiment, the same introduced noise from the microparticles 104 may not be observed or present. Classification accuracy for every location are shown in FIG. 3C. In general, less applied pressure (depth=1) leads to a smaller signal change and lower accuracy. For this sample, location 3 and depth 1 had lower classification accuracy. This may be attributed to a combination of misalignment leading to smaller signals on the right-hand side, which is also apparent in the larger error in locations 2, 3, and 4 in FIGS. 3D (mean absolute error from linear regression output grouped by location for x-position) and 3E (y-position). FIG. 3F shows the mean absolute error for the z-position and FIG. 3G shows the mean absolute error from KNN regression grouped by location for force.

With continuing reference to the demonstrations discussed above, the 24 classes were transformed into their true (x,y,z) coordinates for location estimation. For the 8-point circle and linear regression, the x-position had a mean absolute error of 1.2 mm and the y-position had a mean absolute error of 3.4 mm across all classes. The difference in error between the x and y coordinates may imply a small misalignment in this test, also shown in varied error by location in FIGS. 3D and 3E. The z-position error is relatively smaller (0.03 mm), possibly due to larger signal changes associated with 1 mm depth changes (FIG. 3F).

Figure 2F:
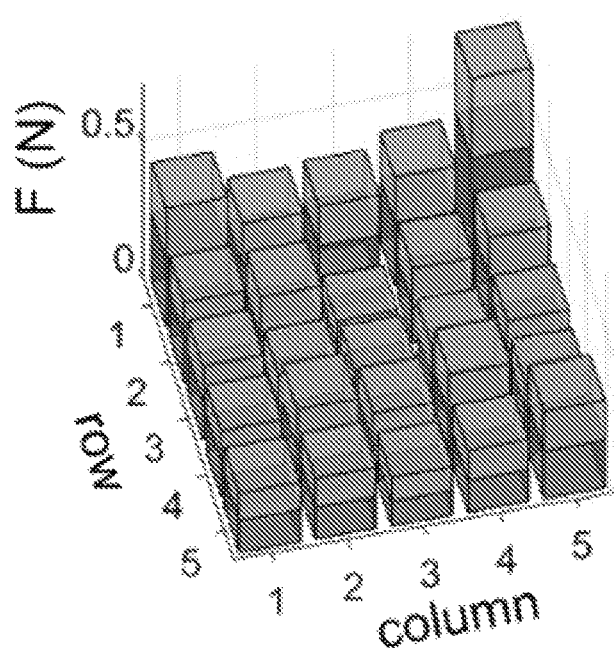

To estimate force, time series data and a k-nearest neighbors (KNN) regression may be used. The inputs can be the Bx, By, and Bz components of the magnetic field, the internal temperature of the magnetometer Bt, and load cell output at each time step. For the 5×5 grid demonstration, the mean error for the force estimation was 0.44 N (FIG. 2F). For the 8-point circle, mean error for the force estimates was approximately 0.25 N (FIG. 3G). The z-axis of the magnetic field had the strongest correlation with the applied pressure, making force estimation relatively accurate. However, a good signal change can be dependent on the amount of deformation. Therefore, if the elastomer 103 used for the magnetic material 101 had a higher Young's modulus, then the force resolution could be larger. The force range applied during both tests was between approximately 0 and 2.5 N, which was limited by a chosen maximum depth of 3 mm.

Figure 4A:
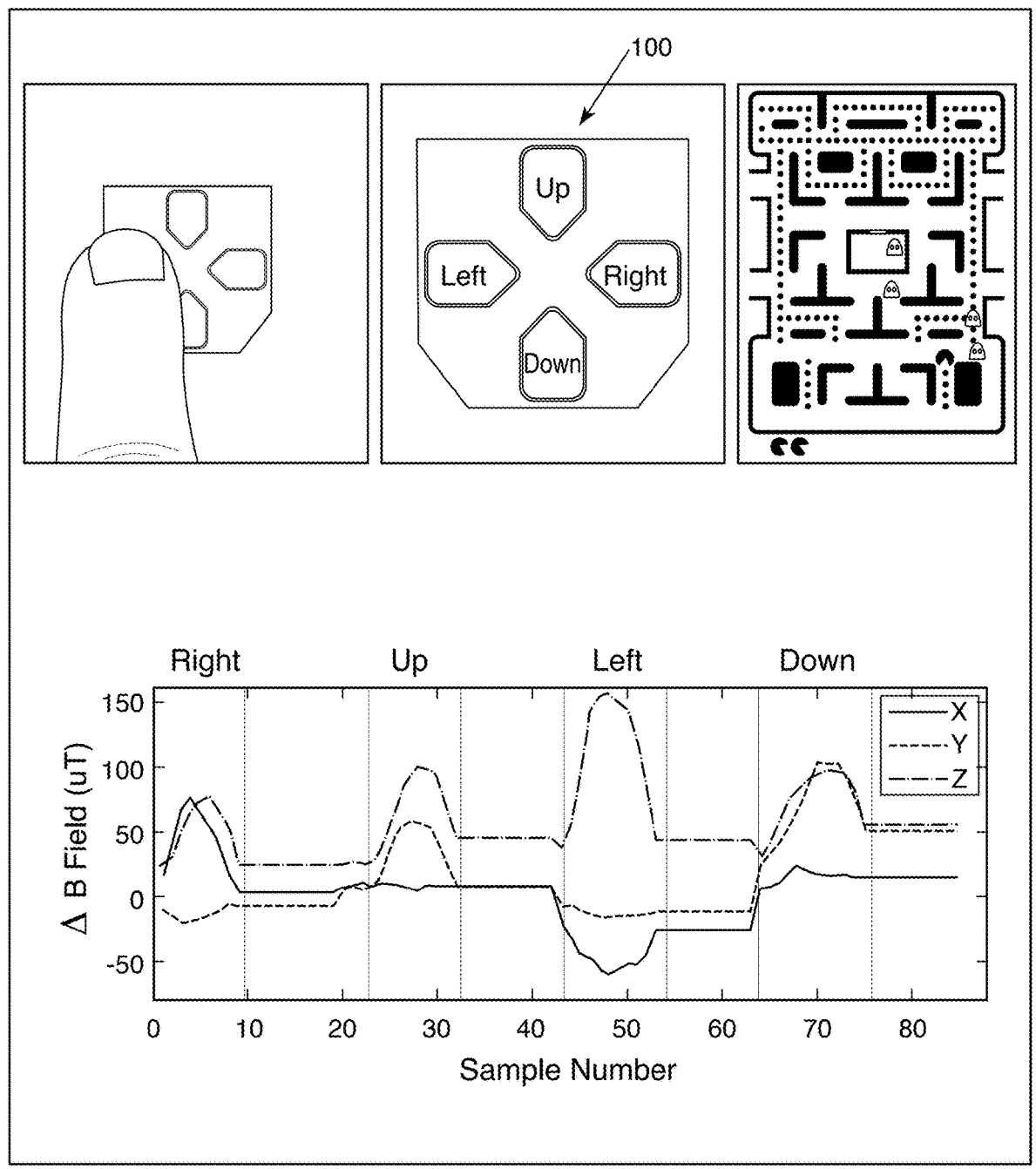
FIGS. 4A-4C are example of sensors according to several alternative embodiments.

As a demonstration of the capabilities of the sensor 100, a simple 4-key directional game pad is shown in FIG. 4A. As shown in FIG. 4A, four acrylic arrows are adhered to the surface of the sensor 100 to help the user locate where to apply pressure in order to input a direction command. The four commands can be identified by the changes in the X,Y, and Z components of the magnetic field. No classifier is used for this example and, instead, simple thresholding is found to be adequate when the buttons are sufficiently spaced. The positive and negative X and Y changes are mapped to the four arrow keys on the keyboard to play Ms. Pac-Man in a web browser. Example data for each direction from the game is also shown in FIG. 4A.

Figure 4B:
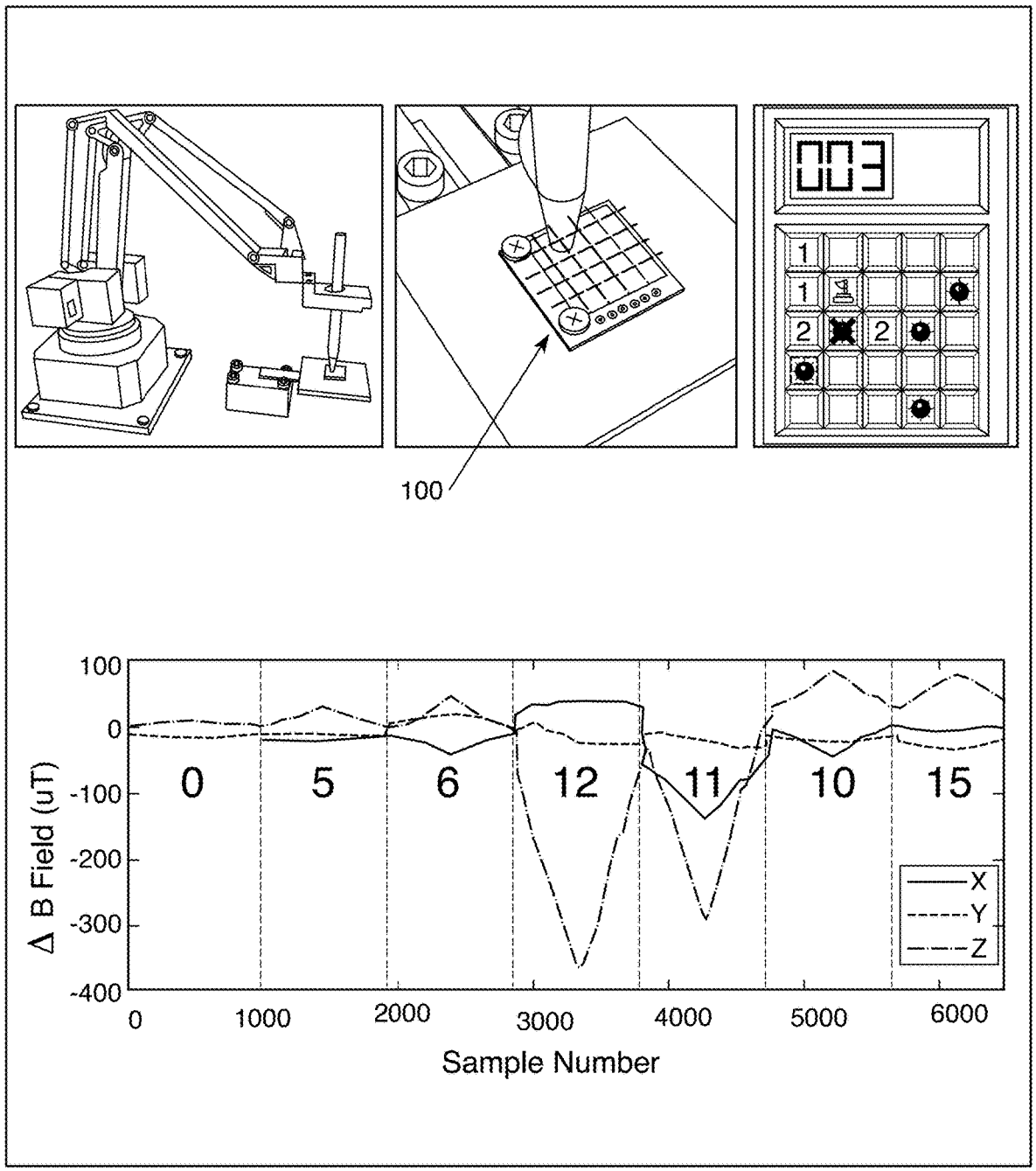

To demonstrate the speed and accuracy of the 5×5 grid classifier, a short game of Minesweeper is played with a robot-controlled cylindrical indenter, as shown in FIG. 4B. Each of the 25 grid locations is mapped to a mouse location on the screen. The length of the signals (i.e. duration of applied pressure) indicates whether the user wants a left-click to reveal the square or a right-click to place a flag. Immediately after the signal returns to resting, the QDA classifier is used to predict the location and then the appropriate actions are performed. Raw data and classification results are shown in FIG. 4B.

Figure 4C:
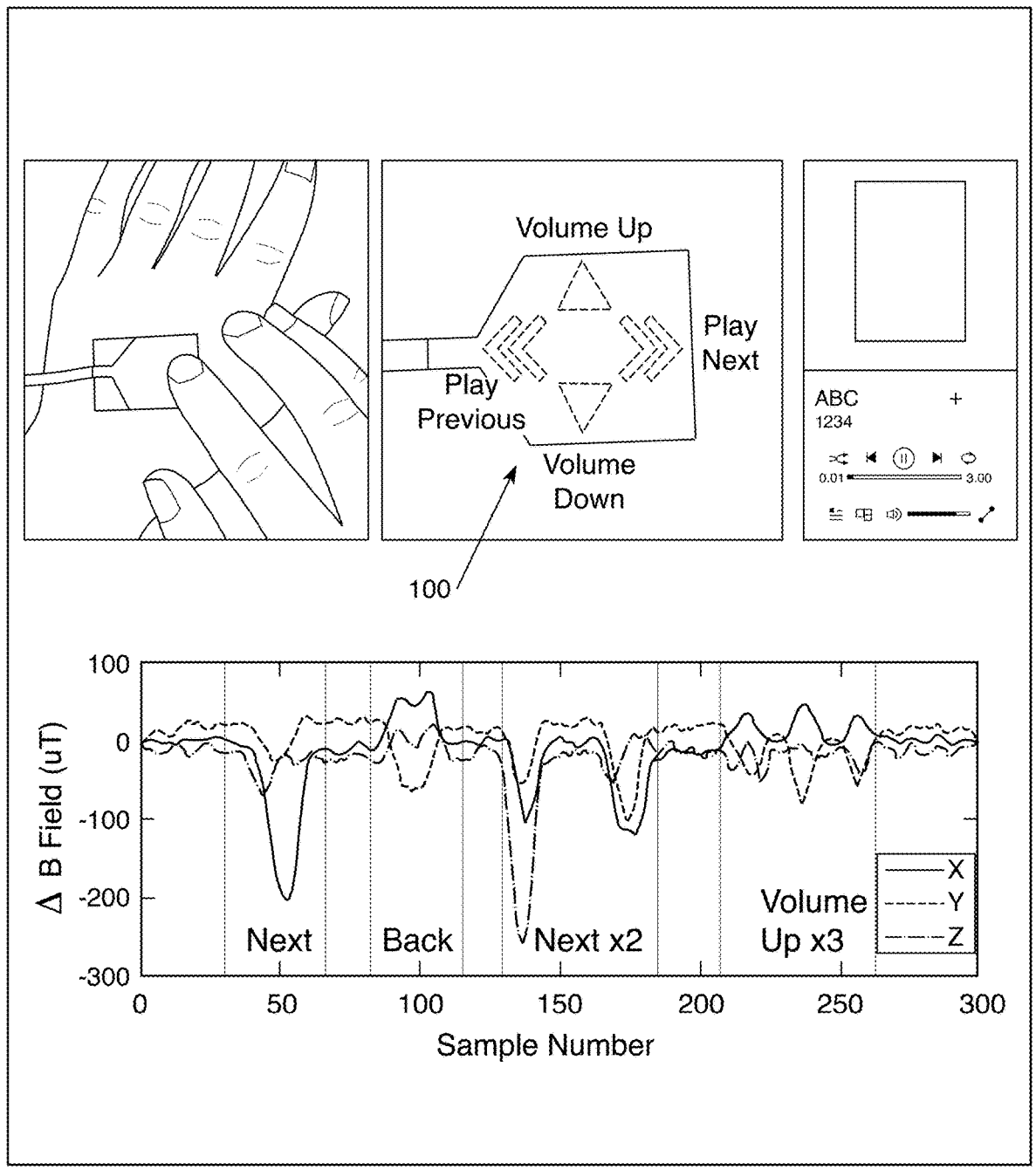

Since sensor 100 is both stretchable and flexible, it can be integrated with existing stretchable circuit techniques. Similar to the 4-key pad, four keyboard commands (ctrl+left, ctrl+right, ctrl+up, ctrl+down) were mapped onto 4 locations (previous, next, volume up, volume down) through vector thresholds to browse through a music playlist (FIG. 4C). Without the acrylic arrows, the user input may vary in location, leading to noisier data. In addition, the user's hand and skin may deform along with the magnetic skin. While both of these factors contribute to additional noise, the system can still function with approximately 4 basic thresholds to determine the quadrant of contact.

In additional embodiments, the range and resolution for force and contact location may be enhanced by tuning the fabrication process of the sensor 100 or magnetic material 101, modifying the training procedure, or adding additional magnetometers 102. The sensors 100 discussed herein may be used in applications including soft robotics, medical devices, manipulation, and tactile surfaces. Further, in some non-limiting embodiments, the sensor 100 can be molded to conform to the geometry of a host system and be magnetically programmed to respond to prescribed mechanical loads or deformations.

With regard to some embodiments discussed herein, time series data is represented as a set of representative features. Further, the 21 features were manually identified in lieu of automated feature selection methods. The 21 features include the minimum, maximum, mean, standard deviation, median, and sum for each axis over the sample (18 features) and the scalar ratios of the between the three axes (3 features). At the end of the contact, the features were calculated from data collected over the time of the contact, and immediately output the classification and regression results. Thus, as discussed herein, deformation of the randomly distributed magnetic particles 104 can create repeatable and separable signals.

In analyzing the data received from the magnetometer 102, the magnetic field strengths are estimated to decay with distance to the magnetometer 102 using an inverse cubic relationship:

$$B_{mag} = \frac{B_{elastomer}}{r^3}$$

Figure 5:
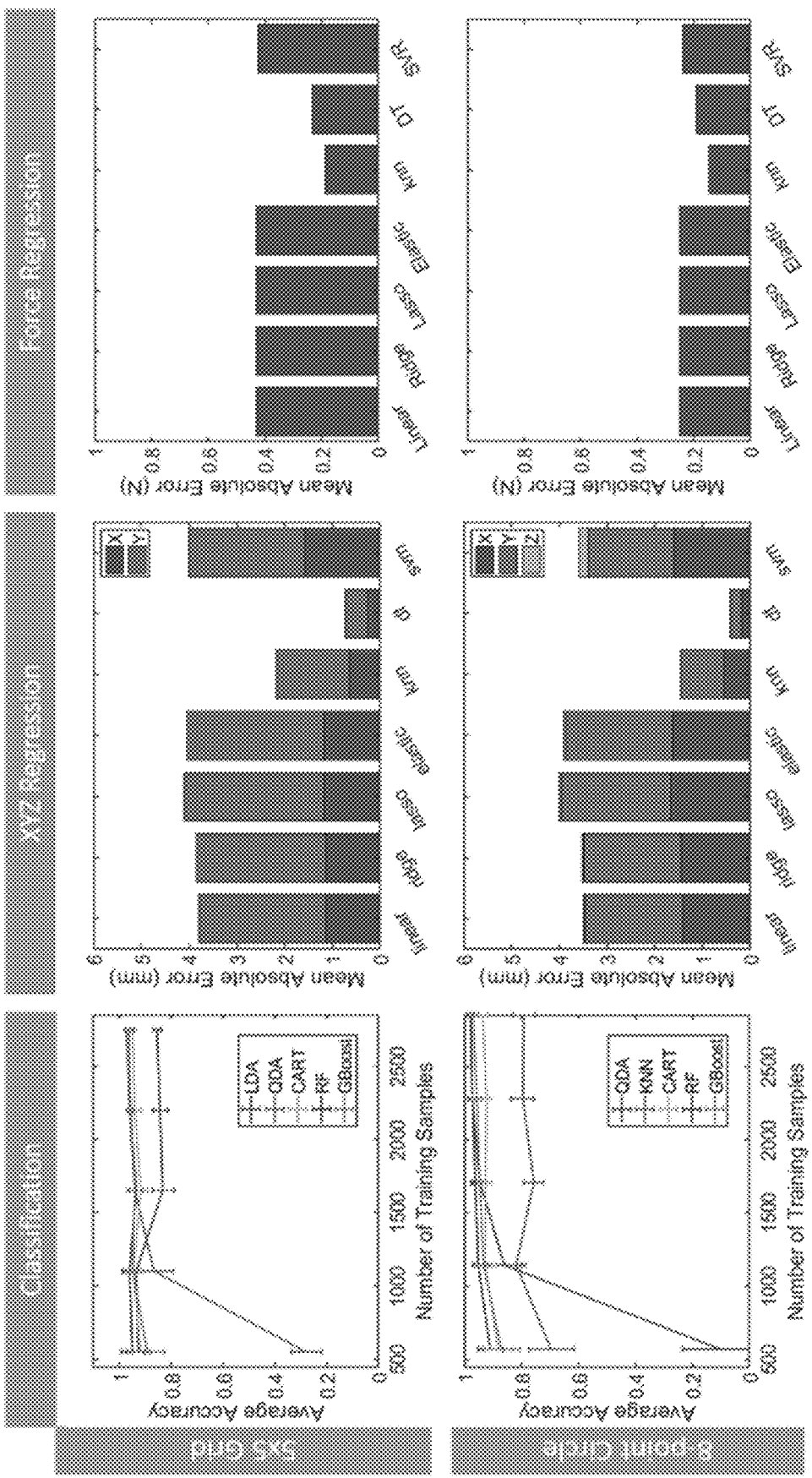
FIG. 5 is a series of graphs showing classification and regression results.

With regard to methodology, classification algorithms from the Python scikit-learn toolkit were evaluated (see FIG. 5 for a full comparison of all the available classification algorithms and implementation details). The results include reduced parameter tuning while being able to successfully distinguish between multiple classes with a relatively small dataset. Supervised learning algorithms that do not require extensive hyperparameter tuning were used and were well-suited for multi-class classification.

In this regard, the following classification algorithms were used:

LDA: Linear Discriminant Analysis is a classifier that aims to find a linear decision boundary under the assumption that each class is a multivariate gaussian density with a mean and the same covariance. We used singular value decomposition (SVD), no shrinkage, priors, or dimensionality reduction.

QDA: Similarly, Quadratic Discriminant Analysis is a classifier that aims to find a quadratic decision boundary between each class. Each class is modeled as a Gaussian density and the output prediction is the class that maximizes Bayes' rule. One key difference from LDA is that QDA does not assume each class has the same covariance matrix.

KNN: K-Nearest Neighbors uses k closest samples by some distance metric to classify the new input. This is a commonly used method for clustering data. Uniform weights, Manhattan distance (l1 norm), and k=5 were used in some experiments discussed herein.

RF: Random Forest classifier fits decision tress on subsamples of the dataset. By randomly splitting the dataset, the classifier chooses the best feature among this subset.

DT: A Decision Tree (DT) classifier creates binary trees and splits the nodes based on the feature that holds the largest information. In aspects discussed herein, decision tree was used using a Classification And Regression Tree (CART) algorithm.

GB: Gradient Boosting (GB) is an ensemble classifier that fits n regression trees to the gradient of the specified loss function. In some aspects discussed herein, 100 estimators, deviant loss, and a learning rate of 0.1 were used.

Figure 6:
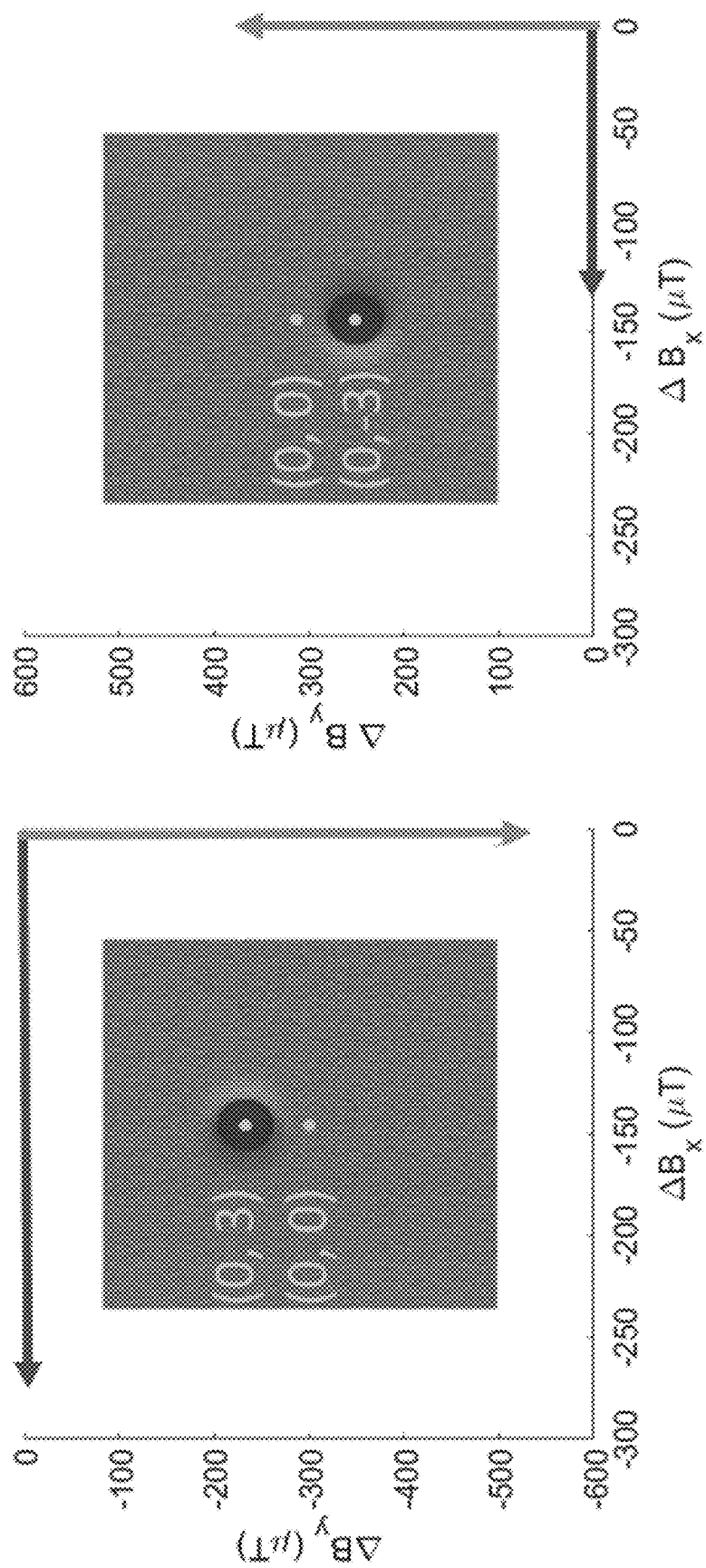
FIG. 6 shows X and Y vectors for an example implementation on a robotic arm.

With regard to regression algorithms, the following regression algorithms were chosen to estimate the XY coordinate location. In reference to some aspects discussed above, some of the regression algorithms were trained using the same features and samples from the previous classification (see FIG. 6).

LR: Linear Regression fits a line using the features as coefficients while minimizing the residual sum of squares.

SVR: Support Vector Regression fits a kernel function by minimizing a specified soft margin, $\varepsilon$. Any error within this a boundary is considered zero and the L1 loss is calculated starting at this boundary. In some cases discussed herein, an $\varepsilon=0.1$ and rbf kernel was used.

DTR: Decision Tree Regressor follows the same principle as decision tree classification by building a decision tree and splitting nodes based on maximizing information. In this regressor however, the output is continuous.

KNN Regressor: The KNN regressor expands the KNN classification schemes to continuous outputs by using weighted average of continuous distance functions.

With regard to the 5×5 grid demonstration discussed herein, several algorithms can distinguish between the 25 classes with 98% accuracy. QDA, notably, requires more samples compared to the other algorithms, to achieve this accuracy. This could be due to the first 1000 samples not capturing the variance in the features. The accuracy from LDA classification decreases with increasing sample size. This may imply that the features may not be linearly separable, as more samples increase the noise. There may be potential in increasing the space of these features to make them more linearly separable.

For the 8-point circle demonstration, several algorithms can distinguish between the 24 classes. In general, decision tree-based approaches perform well. Similar to the 5×5 grid results, QDA requires more samples before achieving similar performance to CART, RF, and GBoost approaches. KNN also performed well in these cases. This may be attributed to the z-direction magnetic field separating classes [0,7], [8,15], and [16, 23] by magnitude. This allows the clusters to already reduce the problem down to 8 options very quickly. Because the circle radius is smaller than the 5×5 grid, the same noise is not seen from the material's particle distribution discussed previously.

Linear regression algorithms (linear, ridge, lasso, elastic) all have a continuous output that can estimate the X location with a mean error of approximately 1.1 mm and the Y location with a mean error of approximately 2.5 mm. KNN and DT results may be subject to the quasi-discrete nature of the data inputs leading to a quasi-discrete output. A continuous sampling over the entire surface may be used however.

With regard to raw vectors for 5×5 grid, the magnetometer 102 can have an internal coordinate frame that can be determined by the magnitude and direction of the output vectors. For example, the x-axis of the magnetometer 102 is crossed in FIG. 6, the output can change from negative to positive. Each quadrant around the signals can reflect the correct sign based on their location, and the magnitude of the signal to decrease with distance from the magnetometer 102. However, several discrepancies from this pattern can appear in the edges of the grid experiment.

Figure 7:
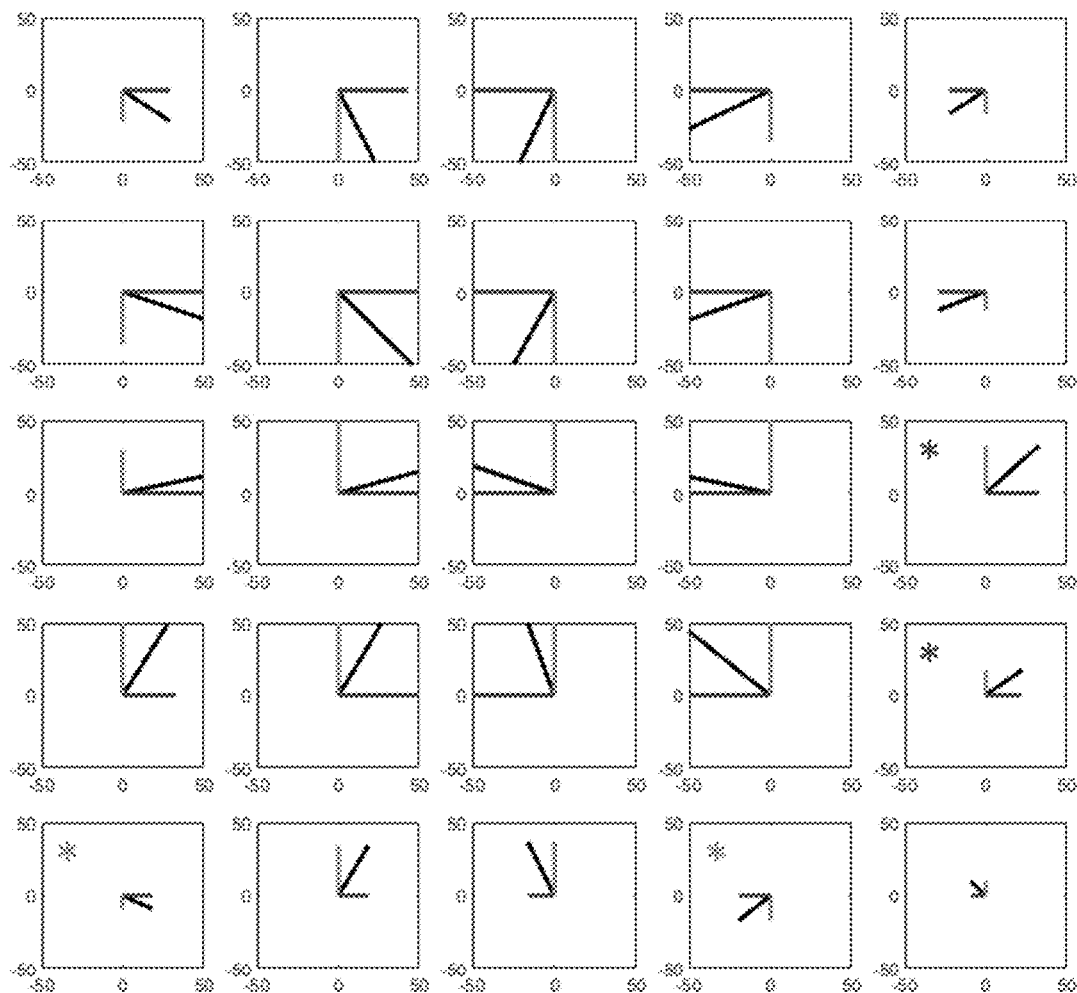
FIG. 7 are vectors visualized for indentation of the magnetic material.

In FIG. 7, the max Bx and Bt vectors are plotted for each location in the grid pattern for a 3 mm indentation in 25 locations at 10 mm/min. Discrepancies are marked with an asterisk in FIG. 7. Note that the inner 9 location signals are quite large relative to the edges, and the full vectors are not shown in the frame. However, it is apparent that the inner 9 locations follow the expected sign of the x- and y-axis of the magnetometer 102. Specifically, the X vector follows a (pos, neg, neg) pattern from left to write as we cross the y-axis. Similarly, the Y vector follows a (neg, pos, pos) pattern from top to bottom as we cross the x-axis. These patterns are expected and follow from the approximate theory.

The edge cases are slightly different. For example, consider the X vectors (red) in locations 15 and 20. Although they are on the negative side of the x-axis, shown by the center 9 locations, the signal is positive. This discrepancy only shows up in the edge locations. This may be attributed to the non-uniformity of the sample outweighing the deformation applied at this distance away from the magnetometer 102. Due to the inverse cube relationship, the signal can decay very quickly with distance. In other words, the displacement of the aggregate particles under the indentor can have a larger effect on the net magnetic field change than the bulk displacement. A similar effect can be seen in the Y vectors (green) for locations 20 and 24, where the signal should be positive, but is instead relatively small and negative. These relatively unpredicatable discrepancies can motivate use of data-driven techniques over model-based techniques.

In other non-limiting embodiments, the magnetometer 102 may be configured to sense a deformation of the composite magnetic material 101 while being moved about relative to the composite magnetic material 101 during operation. For example, in at least one non-limiting embodiment, the composite magnetic material 101 may be located on a gripper or hand of a robotic arm while the magnetometer 102 is located on another portion of the robotic arm, such as on an elbow, shoulder, base, or other location. During operation of such an exemplary embodiment, the gripper or hand may move simultaneously with other aspects of the robotic arm, including the aspect(s) that includes the magnetometer 102, causing both the composite magnetic material 101 and the magnetometer 102 to move relative to one another. In this regard, the magnetometer 102 may be configured to sense a deformation of the composite magnetic material 101 while being moved about during operation. In yet other embodiments, a magnetometer 102 may be located at a location different from the robotic arm or other device that is connected to the composite magnetic material, such as on an object to be manipulated by a robotic arm.

Figure 9:
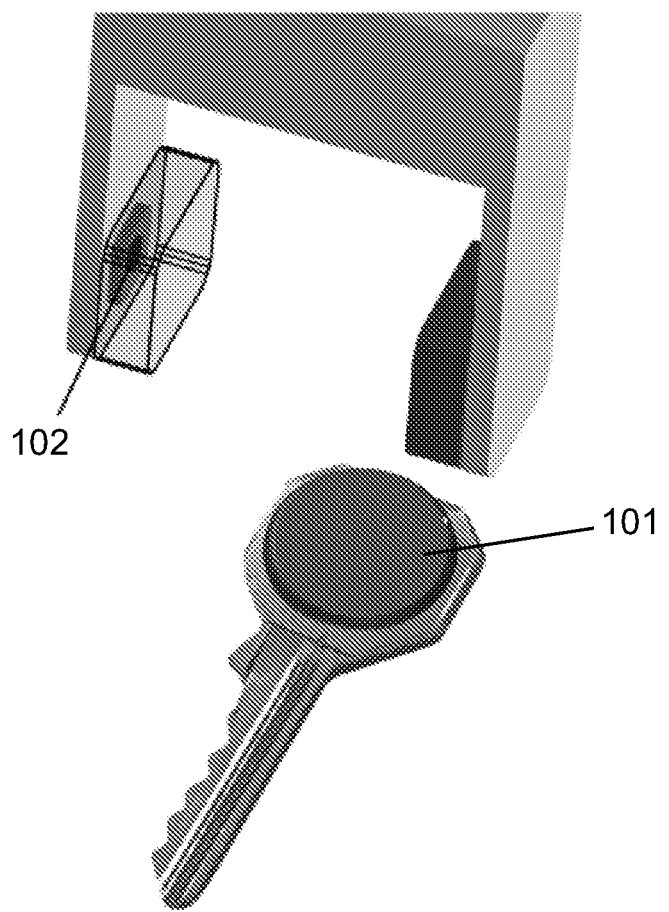
FIG. 9 is an alternative embodiment of the sensor with a magnetometer separated from the magnetic material.

In the embodiment shown in FIG. 9, the magnetic material 101 is attached to a key, where the magnetometer 102 is part of a robotic gripper. The magnetometer 102 within the robotic gripper can localize to the magnetic material 101 on the key with sub-mm accuracy and enable the robot to pick up objects in the same place, in the same way, every time. Further, the robot can consistently localize a repeatable grasp and object pose even before contact. The magnetometer 102 is available in a small format (7×7×2 mm), provides fast sampling rates (>100 Hz), and can easily integrate into systems via serial communication.

Figure 10:
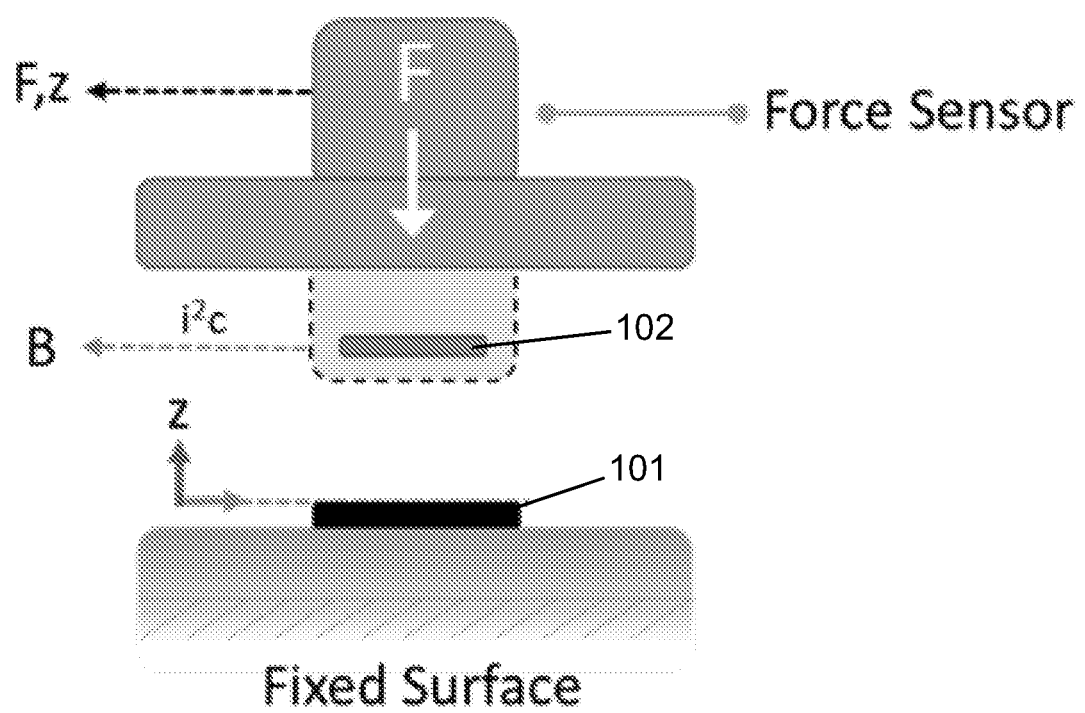
FIG. 10 shows another alternative embodiment.

FIG. 10 depicts an alternative embodiment of a sensor 100 with a magnetometer 102 separated from the magnetic material 101, allowing 3D localization. By separating the magnetic material 101 from the magnetometer 102, the robot is able to move freely and measure the surrounding magnetic flux changes due to both motion and deformation. The sensor 100 can be complimentary to vision-based object localization. In one example embodiment of a sensor 100 with separated components, a 3-axis magnetometer 102 is mounted on a circuit board with four input wires for SDA, SCL, 3.3V, and GND. These four wires allow the magnetometer 102 to communicate with a small microcontroller attached to the end-effector, or gripper, using $i^2c$.

For the sensors 100 depicted in FIGS. 9-10, localization and force-feedback is governed by Maxwell's equations for electromagnetism. For some applications, the process can be simplified by estimating the shape of the magnetic field above the magnetic material 101 as a 2D Gaussian. Using this basis, the z-component of the magnetic field at the surface of the magnetic material 101 can be determined and measured by the magnetometer 102. For example, for a thickness of 2 mm, the magnetic material 101 used in this example embodiment can range from 3500 to 4500 μT and serves as a reasonable bound for a least squares fit.

As the robotic gripper, and magnetometer 102, pass near the magnetic material 101, the position of the gripper is recorded when the maximum magnetic field is encountered. Moving the gripper to this location will result in centering the magnetic material 101 in that axis. By repeating the process in another direction, the robotic gripper can be centered over the magnetic material 101.

Alternatively, a complementary vision-based system will be able to locate the robotic gripper in the proximity of the object to which the magnetic material 101 is affixed, but will not have information regarding the scan direction. In this situation, a short distance scan in any direction can be performed and fitting a 1D Gaussian to the data points via a non-linear least squares optimization. The process can then be repeated for a second axis. Performing these steps, the robotic gripper can be positioned at the estimated peak of the Gaussian. Once the robotic gripper containing the magnetometer 102 has localized to the central axis, the Maxwell equations can be used to estimate the location of the surface of the magnetic material 101. The robotic gripper can then be moved in increments to approach the surface of the magnetic material 101.

In additional embodiments, the system may include a number of magnetometers at any number of locations to sense a deformation or deformations in the composite magnetic material 101. In yet further embodiments, the plurality of magnetic particles 104 may include materials such as Neon (Ne), Iron (Fe), Boron (B), Neodymium (Nd), Samarium (Sm), Cobalt (Co), and any suitable combination thereof. Further, in some non-limiting embodiments, the plurality of magnetic particles include micro-particles, including particles having dimensions in the range of $10^{-7.5}$ meters to $10^{-4.5}$ meters and particles having dimensions in the range of 0.5 μm (micrometers) to 0.5 mm (millimeters), and/or nano-particles, including particles having dimensions less than 700 nm (nanometers).

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof In particular, one or more features in any of the embodiments described herein may be combined with one or more features from any other embodiments described herein.

Protection may also be sought for any features disclosed in any one or more published documents referred to and/or incorporated by reference in combination with the present disclosure.

What is claimed is:

1. A sensor comprising:
    a magnetometer disposed on a substrate;
    a stretchable magnetometer circuit connected to the magnetometer;
    a composite magnetic material having a magnetic field, comprising:
        a deformable material; and
        a plurality of magnetic particles dispersed within the deformable material,
        wherein the composite magnetic material has a base affixed to the substrate,
        wherein the magnetometer is positioned adjacent to the base of the composite magnetic material on an area of the substrate covered by the base; and
    a reference magnetometer positioned at a distance from the composite magnetic material and is configured to measure magnetic signals distinct from the magnetic field of the composite magnetic material,
    wherein the magnetometer is configured to sense the magnetic field of the composite magnetic material,
    wherein the magnetometer is configured to remain in a substantially fixed position relative to the base of the composite magnetic material in response to a deformation of the composite magnetic material, wherein a portion of the magnetic particles move relative to each other in response to the deformation.

2. The sensor of claim 1, wherein the magnetometer is configured to sense a change in the magnetic field of the composite caused by the deformation of the composite magnetic material.

3. The sensor of claim 1, wherein the deformable material is an elastomer.

4. The sensor of claim 1, wherein the composite magnetic material is in contact with the magnetometer.

5. The sensor of claim 1, wherein the magnetometer is a 3-axis magnetometer.

6. The sensor of claim 1, wherein the plurality of magnetic particles are 200 μm or smaller.

7. The sensor of claim 1, wherein the plurality of magnetic particles have a substantially homogenous magnetic orientation.

8. The sensor of claim 1, wherein the plurality of magnetic particles have a substantially heterogeneous magnetic orientation.

9. The sensor of claim 1, wherein the plurality of magnetic particles are distributed substantially non-uniformly throughout the deformable material.

10. The sensor of claim 1, wherein the composite magnetic material is substantially stretchable.

11. The sensor of claim 1 or 2, wherein the composite magnetic material retains the material characteristics of the deformable material.

12. The sensor according to claim 1, wherein the stretchable magnetometer circuit is formed on the composite magnetic material.

13. The sensor of claim 2, wherein the change in the magnetic field of the composite magnetic material occurs in response to the deformation, and wherein the deformation causes at least one of the plurality of magnetic particles to change a location relative to the magnetometer.

14. The sensor of claim 1, further comprising:
    at least one additional magnetometer positioned adjacent to the composite magnetic material, wherein a sensing range of the at least one additional magnetometer partially overlaps with a sensing range of the magnetometer.

15. The sensor of claim 1, wherein the composite magnetic material is deformable in a direction orthogonal to a plane defined by the base.

16. The sensor of claim 1, wherein the magnetometer is configured to sense a change in the magnetic field of the composite magnetic material resulting from a deformation of the composite magnetic material in a direction orthogonal to a plane defined by the base of the composite magnetic material.

\* \* \* \* \*